US012539014B2

(12) United States Patent
Wang et al.

(10) Patent No.: US 12,539,014 B2
(45) Date of Patent: Feb. 3, 2026

(54) METHOD FOR DETERMINING DOSAGE OF DETERGENT, DISHWASHER, PROCESSOR, AND STORAGE MEDIUM

(71) Applicant: FOSHAN SHUNDE MIDEA WASHING APPLIANCES MANUFACTURING CO., LTD., Foshan (CN)

(72) Inventors: Caixia Wang, Foshan (CN); Feibao Zhang, Foshan (CN); Zhiheng Fan, Foshan (CN); Yongbing Quan, Foshan (CN)

(73) Assignee: FOSHAN SHUNDE MIDEA WASHING APPLIANCES MANUFACTURING CO., LTD., Foshan (CN)

( * ) Notice: Subject to any disclaimer, the term of this patent is extended or adjusted under 35 U.S.C. 154(b) by 389 days.

(21) Appl. No.: 18/252,887

(22) PCT Filed: Jan. 11, 2022

(86) PCT No.: PCT/CN2022/071254
§ 371 (c)(1),
(2) Date: May 15, 2023

(87) PCT Pub. No.: WO2022/148470
PCT Pub. Date: Jul. 14, 2022

(65) Prior Publication Data
US 2023/0414061 A1 Dec. 28, 2023

(30) Foreign Application Priority Data
Jan. 11, 2021 (CN) .......................... 202110032059.9

(51) Int. Cl.
*A47L 15/00* (2006.01)
*A47L 15/23* (2006.01)
(Continued)

(52) U.S. Cl.
CPC ....... *A47L 15/4295* (2013.01); *A47L 15/0055* (2013.01); *G06T 7/0002* (2013.01);
(Continued)

(58) Field of Classification Search
USPC .......................................................... 382/103
See application file for complete search history.

(56) References Cited

U.S. PATENT DOCUMENTS

2011/0219550 A1* 9/2011 Choi ....................... D06F 34/18
68/12.04
2012/0138092 A1* 6/2012 Ashrafzadeh ....... A47L 15/4295
134/57 D
(Continued)

FOREIGN PATENT DOCUMENTS

CN 108523801 A 9/2018
CN 108852236 A 11/2018
(Continued)

OTHER PUBLICATIONS

ISR mailed Apr. 6, 2022 regarding PCT /CN2022/071254.

*Primary Examiner* — Chineyere Wills-Burns
(74) *Attorney, Agent, or Firm* — K&L Gates LLP

(57) ABSTRACT

A method for determining the usage amount of detergent, and a dishwasher, a processor, a storage medium and a computer program product. The method for determining the usage amount of detergent includes acquiring an internal image of a dishwasher captured by an image acquisition device; according to the internal image, determining whether there is a target object in the dishwasher; when it is determined that there is a target object, generating a position table of the target object; determining the dirtiness of the target object according to the position table; and determining the usage amount of detergent for the dishwasher according to the dirtiness. The dirtiness of a target object needing to be cleaned in a dishwasher is determined by means of an image (Continued)

acquisition device, and the usage amount of detergent for the dishwasher is then determined according to the dirtiness.

14 Claims, 4 Drawing Sheets

(51) Int. Cl.
*A47L 15/42* (2006.01)
*A47L 15/50* (2006.01)
*G06T 7/00* (2017.01)
*G06T 7/70* (2017.01)
*G06V 20/50* (2022.01)

(52) U.S. Cl.
CPC ............... *G06T 7/70* (2017.01); *G06V 20/50* (2022.01); *A47L 2401/04* (2013.01); *A47L 2501/07* (2013.01)

(56) References Cited

U.S. PATENT DOCUMENTS

| | | | | |
|---|---|---|---|---|
| 2012/0138108 | A1* | 6/2012 | Astiz Montoya | A47L 15/4259 292/137 |
| 2014/0167579 | A1* | 6/2014 | Classen | A47L 15/4463 312/304 |
| 2017/0332877 | A1* | 11/2017 | Pers | A47L 15/0047 |
| 2019/0200841 | A1* | 7/2019 | Yoshimoto | A47L 15/42 |
| 2019/0244375 | A1* | 8/2019 | Choi | G06T 7/0002 |
| 2020/0100642 | A1* | 4/2020 | Heidel | A47L 15/4259 |
| 2020/0178755 | A1* | 6/2020 | Terrádez Alemany | A47L 15/4295 |
| 2021/0076898 | A1* | 3/2021 | Smith | A47L 15/4295 |
| 2021/0093155 | A1* | 4/2021 | Boyer | A47L 15/4244 |
| 2022/0000331 | A1* | 1/2022 | Gordin | A47L 15/46 |
| 2023/0036605 | A1* | 2/2023 | Calvimontes | A47L 15/46 |

FOREIGN PATENT DOCUMENTS

| | | |
|---|---|---|
| CN | 109620078 A | 4/2019 |
| CN | 110037633 A | 7/2019 |
| CN | 110359221 A | 10/2019 |
| CN | 111568327 A | 8/2020 |
| CN | 112741580 A | 5/2021 |
| JP | 2009055935 A | 3/2009 |

* cited by examiner

METHOD FOR DETERMINING DOSAGE OF DETERGENT, DISHWASHER, PROCESSOR, AND STORAGE MEDIUM

CROSS-REFERENCES TO RELATED APPLICATIONS

The present disclosure is a national phase application of International Application No. PCT/CN2022/071254, filed on Jan. 11, 2022, which claims priority to Chinese patent application No. 202110032059.9, filed on Jan. 11, 2021, the entireties of which are herein incorporated by reference.

FIELD

The embodiments relates to the field of household appliances, in particular to a method for determining a dosage of detergent, a dishwasher, a processor, and a storage medium.

BACKGROUND

With the improvement of living standards, dishwashers are more and more extensively used, the application of intelligence is wider and wider, and correspondingly, requirements for the dishwasher are higher and higher, and the most important function of the dishwasher, i.e., the ability of washing tableware clean, gets the most attention of users.

With respect to a conventional dishwasher, a dosage of detergent generally is calculated according to the number and the area of tableware in the dishwasher. When a large amount of tableware is needed to be washed, a high dosage of detergent may be applied; however, directly increasing the dosage of detergent may cause waste of detergent.

SUMMARY

In order to overcome the disadvantages in the prior art, embodiments are to provide a method and apparatus for determining a dosage of detergent, a dishwasher, a processor, a storage medium, and a computer program product.

In order to achieve the objective above, in a first aspect, a method for determining a dosage of detergent is provided, which is applied to a dishwasher and includes:
  obtaining an internal image of the dishwasher, acquired by an image acquisition device;
  determining whether a target object exists in the dishwasher according to the internal image;
  generating a position grid of the target object in accordance with a determination that the target object exists;
  acquiring a degree of fouling of the target object according to the position grid; and
  determining the dosage of detergent of the dishwasher according to the degree of fouling.

In a second aspect, the embodiments provides a processor, configured to implement the above-mentioned method for determining the dosage of detergent.

In a third aspect, the embodiments provides a dishwasher, including:
  an image acquisition device, configured to acquire an internal image of the dishwasher; and
  the above-mentioned processor.

In a fourth aspect, the embodiments provides a machine-readable storage medium, having an instruction stored thereon. The instruction is configured to enable a machine to implement the above-mentioned method for determining the dosage of detergent.

According to the embodiments above, the degree of fouling of the target object which needs to be washed in the dishwasher is acquired by the image acquisition device, and then the dosage of detergent of the dishwasher is determined according to the degree of fouling, and the dishwasher can determine the dosage of detergent according to the degree of fouling of tableware, to avoid a case that tableware is not thoroughly washed due to the excessively small dosage of detergent or waste is caused due to the excessive dosage of detergent.

REFERENCE SIGNS

100—dishwasher; 1—shell; 2—washing mechanism; 21—image acquisition device; 22—storage shelf, 23—driving motor; 24—processing device; 25—spraying arm; 26—mounting bracket; 251—spraying holes.

DETAILED DESCRIPTION OF THE DISCLOSURE

The embodiments of the embodiments will be illustrated in detail below in combination with the drawings. It should be understood that the specific implementation modes described herein are merely used for illustrating and explaining the embodiments of the embodiments, but not intended to limit the embodiments of the embodiments.

Figure 1A:
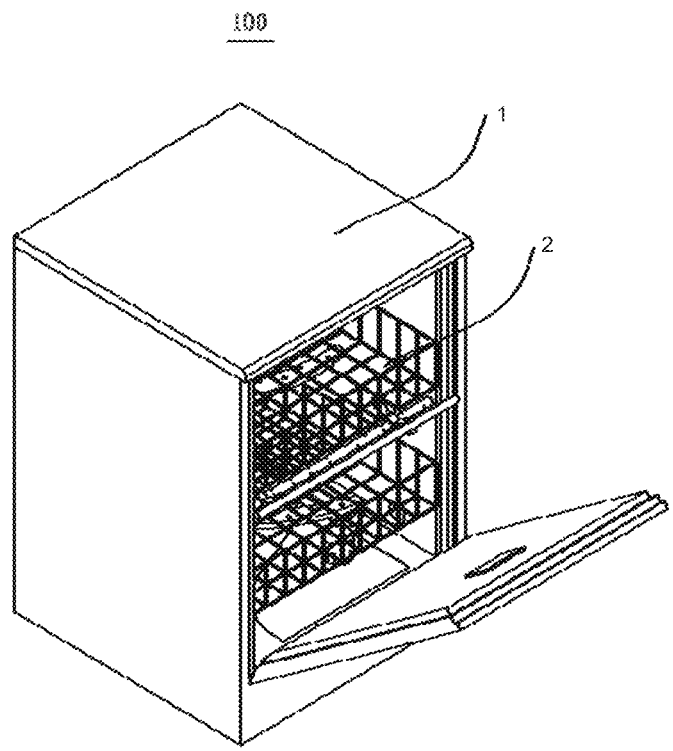
FIG. 1A schematically shows a structural schematic diagram of a dishwasher according to an embodiment of the embodiments, and a control method for a dishwasher according to an embodiment of the embodiments can be applied.
Figure 1B:
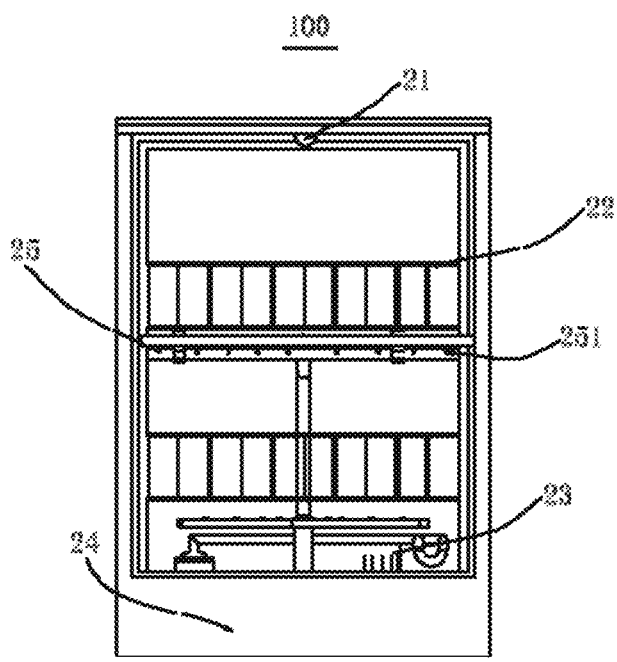
FIG. 1B schematically shows a main view of a structure of the dishwasher according to the embodiment of the embodiments.

FIG. 1A schematically shows a structural schematic diagram of a dishwasher according to an embodiment of the embodiments, and a control method for a dishwasher according to an embodiment of the embodiments can be applied. FIG. 1B schematically shows a main view of a structure of the dishwasher according to the embodiment of the embodiments. It should be understood that FIG. 1A and FIG. 1B only show one embodiment that shows a dishwasher 100, and are not intended to limit appearances, positions, mounting modes, and connection relationships of components of the dishwasher, which are not related to the embodiments.

As shown in FIG. 1A and FIG. 1B, the dishwasher 100 may include a shell 1 and a washing mechanism 2 installed inside the shell 1. A contour of the shell 1 may include, but is not limited to, a rectangle shape and a cylinder shape.

The washing mechanism 2 may include an image acquisition device 21, a storage shelf 22, a processing device 24, and a spraying arm.

The storage shelf 22 (e.g., a bowl basket) may be fixed on the inner side of the dishwasher 100 for accommodating tableware, and the image acquisition device 21 may include a camera or an image sensor (e.g., an infrared sensor). The image acquisition device 21 may be arranged in multiple orientations in the dishwasher 100. The processing device 24 may be electrically connected with the image acquisition device 21.

The image acquisition device 21 may be configured to obtain an internal image of the dishwasher 100, and the processing device 24 may be configured to process the acquired image.

For example, after tableware is placed on the storage shelf 22, the image acquisition device 21 can acquire an image of the tableware on the storage shelf 22. The processing device 24 can obtain the image and determine features of the tableware placed in the dishwasher 100 to control the spraying arm to wash the tableware according to the features of the tableware.

Examples of the processing device 24 may include, but are not limited to, a general-purpose processor, a special processor, a conventional processor, a digital signal processor (DSP), microprocessors, one or more microprocessors associated with a core of the DSP, a controller, a microcontroller, an application specific integrated circuit (ASIC), a field programmable gate array (FPGA) circuit, any other types of integrated circuits (ICs) and state machines, etc.

In one example, the spraying arm may be installed at the bottom inside the dishwasher 100, the spraying arm may be provided with a spraying hole, water can be sprayed out upwards from the spraying hole, and while tableware is washed, a counter-acting force is provided to push the spraying arm to rotate. In another example, the spraying arm may be installed at the top inside the dishwasher 100, or may include a top spraying arm and a bottom spraying arm.

In another example, the spraying arm may adopt a rotatable form.

Figure 1C:
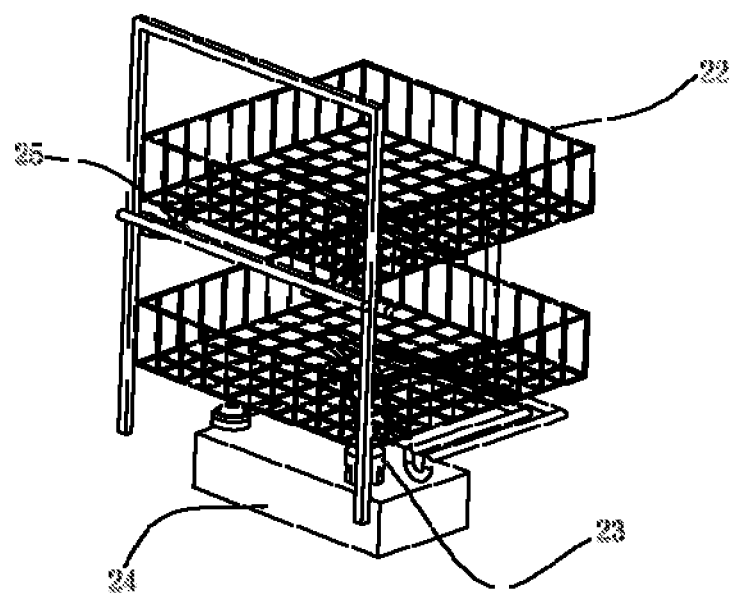
FIG. 1C schematically shows a structural schematic diagram of a washing mechanism of the dishwasher according to the embodiment of the embodiments.
Figure 1D:
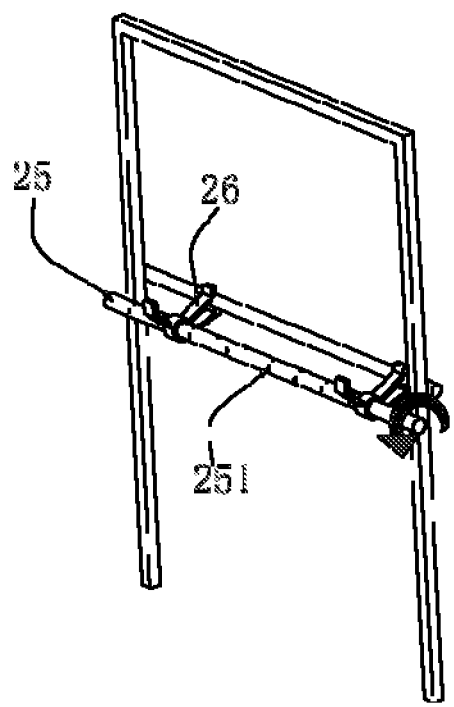
FIG. 1D schematically shows a structural schematic diagram of part of the washing mechanism in FIG. 1C.

FIG. 1C schematically shows a structural schematic diagram of a washing mechanism of the dishwasher according to the embodiment of the embodiments; and FIG. 1D schematically shows a structural schematic diagram of part of the washing mechanism in FIG. 1C. With reference to FIGS. 1B-1D, the washing mechanism 2 may also include a driving motor 23, the driving motor 23 may be installed on the lower side inside the dishwasher 100, or may be installed on the back of the dishwasher 100, i.e., away from one side where a user places tableware. The driving motor 23 may be connected with the spraying arm 25. The spraying arm 25 is provided with spraying holes 251 communicating with the inside of the spraying arm 25, and the spraying holes 251 may be formed at intervals in the spraying arm 25, and the spraying range of the spraying arm 25 is wider. In one example, the spraying arm 25 may be of a cylinder shape, and the spraying holes 251 are formed at intervals in an array in the section of the spraying arm 25, and water sprayed out from the spraying holes 251 is sprayed at an angle.

In an embodiment of the embodiments, the dishwasher 100 may also include a water pressure transmitter (which is not shown), a water heater (which is not shown), and a water valve (which is not shown). The water pressure transmitter and the water heater may be electrically connected with the processing device 24, and the water pressure transmitter, the water heater, and the water valve may be connected and communicated with the inside of the spraying arm 25. Connections between the spraying arm 25 and the water pressure transmitter, the water heater, the water valve, and the driving motor 23 may be direct connections, or may be indirect connections through intermediate parts.

The water valve may be configured to control the water yield of the sprayed water, the water pressure transmitter may be configured to control the water outlet pressure, the water heater may be configured to control the water outlet temperature, and the driving motor 23 may be configured to drive the spraying arm 25 to rotate. In one example, the spraying arm 25 may be installed at the central position inside the dishwasher. The central position may be defined as the central position of storage shelves 22 in the dishwasher 100, and when the spraying arm 25 rotates, tableware on the storage shelves 22 can be covered, to save the internal space of the dishwasher 100. Tableware on the storage shelves 22 can be sprayed only by one single spraying arm 25, and while the design and material cost is saved, a larger use space is brought in.

The water valve, the water pressure transmitter, the water heater, and the driving motor 23 may be controlled by the processing device 24. For example, a region, where tableware is placed, of the storage shelf 22 may be divided into four quadrants, i.e., first, second, third, and fourth quadrants. The processing device 24 can control the driving motor 23 to drive the spraying arm 25 to rotate, and the spraying holes 251 face any one of the four quadrants. In addition, the processing device 24 can also control the water valve to adjust the water yield of the spraying holes 251 (or stop water discharge).

In an embodiment of the embodiments, the driving motor 23 can also drive the spraying arm 25 to translate. When the spraying arm 25 can translate, the dishwasher 100 may also include a switching mechanism (which is not shown), and the switching mechanism is connected between the driving motor 23 and the spraying arm 25, and can switch rotation of the driving motor 23 into translation of the spraying arm 25.

In an embodiment of the embodiments, the storage shelves 22 may include one or more layers of storage shelves, e.g., upper and lower layers of storage shelves. In an example of two layers of storage shelves shown in the drawing, the spraying arm 25 may be positioned at the middle position of two storage shelves 22, and when the spraying arm 25 rotates, all tableware on the two storage shelves 22 can be sprayed.

In an embodiment of the embodiments, the dishwasher 100 may also include a mounting bracket 26, and the spraying arm 25 is rotatably connected to the mounting bracket 26. The position of the mounting bracket 26 is fixed, and the spraying arm 25 can rotate relative to the mounting bracket 26. There is no limitation to the mode of fixing the position of the mounting bracket 26, and for example, the mounting bracket 26 may be fixedly connected to the storage shelf 22 or other positions.

Figure 2:
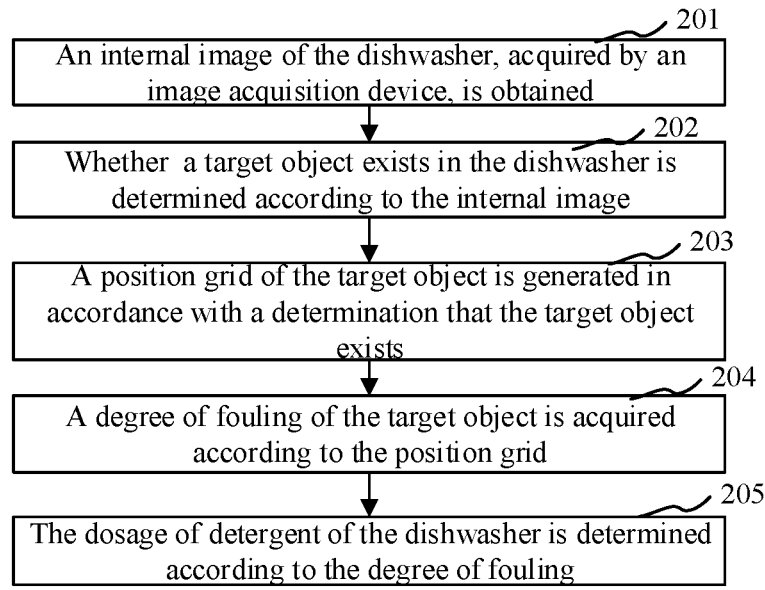
FIG. 2 schematically shows a flow schematic diagram of a method for determining a dosage of detergent according to an embodiment of the embodiments.

FIG. 2 schematically shows a flow schematic diagram of a method for determining a dosage of detergent according to an embodiment of the embodiments. As shown in FIG. 2, in one embodiment of the embodiments, provided is a method for determining a dosage of detergent, including the following steps:

S201: An internal image of a dishwasher, acquired by an image acquisition device, is obtained.

S202: Whether a target object exists in the dishwasher is determined according to the internal image.

S203: A position grid of the target object is generated in accordance with a determination that the target object exists.

S204: A degree of fouling of the target object is acquired according to the position grid.

S205: The dosage of detergent of the dishwasher is determined according to the degree of fouling.

The image acquisition device is installed in the dishwasher, and the internal image of the dishwasher can be acquired; and a processor can determine whether the target object exists in the dishwasher through the obtained internal image of the dishwasher. The processor can set the target object as tableware placed in the dishwasher. After determining that the target object exists in the dishwasher, the processor can acquire the degree of fouling of the target object through the internal image; and the processor can determine the dosage of detergent of the dishwasher according to the determined degree of fouling.

In an embodiment, acquiring the degree of fouling of the target object in accordance with a determination that the target object exists includes: generating the position grid of the target object in accordance with a determination that the target object exists; and acquiring the degree of fouling of the target object according to the position grid.

The processor determines that the target object exists in the dishwasher according to the internal image of the dishwasher, which is acquired by the image acquisition device; the processor can form the position grid according to the target object; the position grid refers to a two-dimensional plane grid set by the processor according to a tableware frame in the dishwasher; and the position grid is determined according to rows and columns of the tableware frame. For example, a position on the tableware frame in the second row and in the third column corresponds to $A_2B_3$ in the position grid. The processor can determine a position of the target object and the corresponding position grid according to a placement position of the target object on the tableware frame of the dishwasher. The processor can acquire the degree of fouling of the target object in the dishwasher according to the position grid.

In an embodiment, acquiring the degree of fouling of the target object according to the position grid includes: determining a first position of the target object in the position grid; determining a neighboring object adjacent to the target object in the position grid according to the first position; acquiring a first degree of fouling of the target object and a second degree of fouling of the neighboring object; and determining the sum of a preset proportion of the second degree of fouling and the first degree of fouling as the degree of fouling of the target object.

The processor can determine the first position of the target object in the position grid according to the generated position grid. The processor can determine the neighboring object adjacent to the target object according to the determined first position of the target object. The first position of the target object in the position grid refers to a position of the target object in the position grid. The processor can determine the neighboring object adjacent to the target object according to the position of the target object. The first degree of fouling may refer to a degree of fouling of the target object per se, and the second degree of fouling may refer to a degree of fouling of the neighboring object adjacent to the target object. The processor can acquire the first degree of fouling of the target object and the second degree of fouling of the neighboring object according to the internal image of the dishwasher. The processor can determine the sum of the preset proportion of the second degree of fouling of the neighboring object and the first degree of fouling of the target object as the degree of fouling of the target object, which is determined by the processor.

For example, it is assumed that according to the position A of the target object, the processor determines the neighboring objects adjacent to the target object, which respectively are a left neighboring object B, a right neighboring object C, an upper neighboring object D, and a lower neighboring object E, and the first degree of fouling of the target object is A1, and the degree of fouling of the neighboring objects are B1, C1, D1, and E1, respectively. Assuming that the processor sets the preset proportion as 0.25, the processor can determine the degree of fouling of the target object as A1+0.25×B1+0.25×C1+0.25×D1+0.25×E1.

In one embodiment, acquiring the first degree of fouling of the target object and the second degree of fouling of the neighboring object includes: determining a first area of the target object and a second area of the neighboring object according to the internal image; acquiring the first degree of fouling according to the first area; and acquiring the second degree of fouling according to the second area.

The processor can determine the first area of the target object and the second area of the neighboring object adjacent to the target object according to the internal image of the dishwasher, which is acquired by the image acquisition device. The first area can refer to an area of the target object. The processor can acquire the first degree of fouling of the target object according to the first area of the target object, and acquire the second degree of fouling of the neighboring object according to the second area of the neighboring object.

In one embodiment, the neighboring object includes at least one of objects adjacent to the target object in the upper, lower, left, and right directions in the position grid.

When the processor determines the neighboring object adjacent to the target object, the neighboring object includes at least one of objects adjacent to the target object in the upper, lower, left, and right directions in the position grid. For example, assuming that the position of the target object is on the upper left corner, at the moment, the neighboring object adjacent to the target object includes an object below the target object or an object on the right of the target object, and then the processor can determine that the neighboring object includes at least one of the objects on the right of or below the target object on the upper left corner. If the target object is positioned at the uppermost part in the position grid, at the moment, the neighboring object adjacent to the target object includes objects in the left, right, and lower directions of the target object, and then the processor can determine that the neighboring object includes at least one of objects in the left, right or lower directions of the target object at the uppermost part.

In one embodiment, determining the dosage of detergent of the dishwasher according to the degree of fouling includes: determining a product of a preset constant coefficient and a square of the degree of fouling as the dosage of detergent of the dishwasher.

The processor can acquire the degree of fouling of the target object according to the internal image of the dishwasher, which is acquired by the image acquisition device. The processor can preset the constant coefficient. The processor can determine the product of the preset constant coefficient and the square of the degree of fouling as the dosage of detergent of the dishwasher.

In one embodiment, determining whether the target object exists in the dishwasher according to the internal image includes: determining the degree of fouling as a preset value in accordance with a determination that the target object does not exist.

The processor can determine the preset value as 0. the processor can determine whether the target object exists in the dishwasher according to the internal image of the dishwasher, which is acquired by the image acquisition device, and the processor can determine the degree of fouling as the preset value on a condition that the processor determines that the target object does not exist in the dishwasher. Namely, the processor can determine the degree of fouling as 0.

In one embodiment, resetting the dosage of detergent in response to a determination that a door of the dishwasher has a state in which the door is opened and then closed.

The processor can detect the state of the door of the dishwasher, and after determining that the door of the dishwasher has the state in which the door is opened and then closed, the processor can control the dosage of detergent to be reset. The door of the dishwasher has the state in which the door is opened and then closed, which may be because a user additionally puts in new tableware which needs to be washed or reduces the amount of tableware in the dishwasher. In order to more accurately determine the dosage of detergent and prevent a case that waste of a detergent is caused due to the excessive dosage of detergent or tableware is not thoroughly washed due to the excessively small dosage of detergent, the processor can rejudge the degree of fouling of the target object and reset the dosage of detergent through the internal image of the dishwasher, which is acquired by the image acquisition device, on a condition that the door of the dishwasher has the state in which the door is opened and then closed.

Further, in one embodiment, water quality after the dishwasher washes tableware can be detected to determine turbidity, impurities, and the like of the water after washing. Then, according to the water quality, it can be determined whether washing can be ended. For example, if the turbidity of the water after tableware is washed is in conformity with a preset standard, and/or the impurities contained in the water after tableware is washed is in conformity with a preset standard, it can be indicated that the dishwasher has washed tableware clean, and the washing process of the dishwasher has been completed. If the dosage of detergent is excessive, not only is the detergent wasted, but also the washing time will also be prolonged, resulting in reduction of user experience. Meanwhile, due to the case that the washing time is prolonged, increase of power consumption of the dishwasher will also be caused, and more power resources are wasted. Therefore, by adopting the method for determining the dosage of detergent in the embodiments, the reasonable washing capacity can be rapidly and accurately determined according to the degree of fouling of tableware to avoid the case that tableware is not thoroughly washed due to the excessively small dosage of detergent or waste is caused due to the excessive dosage of detergent. Meanwhile, the washing duration of the dishwasher can also be effectively reduced, and resource loss is reduced and the user experience is also improved.

In one embodiment, provided is a processor, configured to implement the method for determining the dosage of detergent according to any one of the embodiments above.

An image acquisition device is installed in a dishwasher, the processor can obtain an internal image of the dishwasher by the image acquisition device, and the processor can determine whether a target object exists in the dishwasher according to the internal image and determine a degree of fouling of the target object according to the target object. The processor can set the target object as to-be-washed tableware. If the processor determines that the target object does not exist in the dishwasher, the processor determines the degree of fouling as a preset value, and the processor can set the preset value as 0.

If the processor determines that the target object exists in the dishwasher, the processor can generate a position grid of the target object according to a position of the target object, and the processor can set the position grid as a two-dimensional array according to rows and columns of a tableware frame in the dishwasher. After generating the position grid of the target object, the processor can determine a first position of the target object in the position grid according to the position grid, i.e., a position of the target object in the position grid. The processor can determine a neighboring object adjacent to the target object according to the table position of the target object, and the processor can set the neighboring object to include at least one of objects adjacent to the target object in the upper, lower, left, and right directions in the position grid.

For example, it is assumed that the processor determines the position of the target object as $A_2B_3$ according to the generated position grid, i.e., the target object is positioned in the second row and in the third column of the tableware frame. Then, the processor can determine an object $A_3B_3$ below the target object, an object $A_1B_3$ above the target object, an object $A_2B_2$ on the left of the target object, and an object $A_2B_4$ on the right of the target object as the neighboring objects adjacent to the target object, and the processor can determine the neighboring objects to include at least one of the four objects above.

The processor acquires a first degree of fouling of the target object and a second degree of fouling of the neighboring object according to the internal image and the positions of the target object and the neighboring object adjacent to the target object, which are determined in the position grid. The processor can determine the sum of a preset proportion of the second degree of fouling and the first degree of fouling as the degree of fouling of the target object.

For example, it is assumed that the processor acquires a degree of fouling of the target object $A_2B_3$ as K1, acquires a degree of fouling of the neighboring object $A_3B_3$ adjacent to the target object as K2, acquires a degree of fouling of the neighboring object $A_1B_3$ as K3, acquires a degree of fouling of the neighboring object $A_2B_2$ as K4, and determines a degree of fouling of the neighboring object $A_2B_4$ as K5. Assuming that the preset proportion of the processor is 0.25, the processor determines the degree of fouling of the target object as $K1+0.25\times K2+0.25\times K3+0.25\times K4+0.25\times K5$.

The processor can determine a first area of the target object and a second area of the neighboring object according to the obtained internal image and the generated position grid. The processor can acquire the first degree of fouling of the target object according to the obtained first area of the target object, and can acquire the second degree of fouling of the neighboring object according to the obtained second area of the neighboring object.

The processor can preset a constant coefficient. After determining the degree of fouling of the target object, the processor can determine a product of the preset constant coefficient and the square of the determined degree of fouling as the dosage of detergent of the dishwasher according to the determined degree of fouling of the target object. Moreover, the processor can detect a state of a door of the dishwasher, and the processor can reset the process of determining the dosage of detergent on a condition that the door of the dishwasher has a state in which the door is opened and then closed.

The processor can reconfirm the dosage of detergent according to the state of the door to avoid a case that a user subsequently changes the amount of tableware in the dishwasher, resulting in the situation that the previously determined dosage of detergent is excessively large or excessively small.

Figure 3:
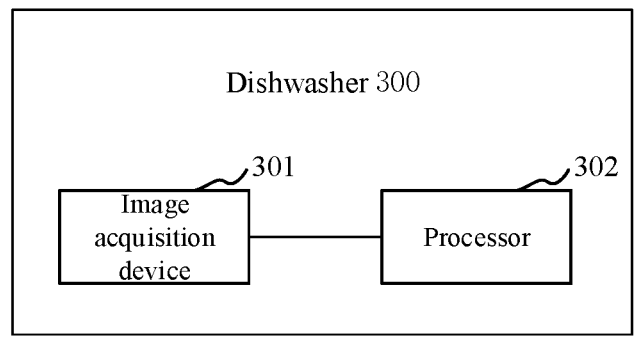
FIG. 3 schematically shows a structural block diagram of a dishwasher according to an embodiment of the embodiments.

In one embodiment, as shown in FIG. 3, provided is a dishwasher 300, including: an image acquisition device 301, configured to acquire an internal image of the dishwasher; and the processor 302 in the above-mentioned embodiment.

A core is contained in the processor, and a corresponding program unit is called from a memory by the core. One or more cores may be arranged, and determination on a dosage of detergent is implemented by adjusting parameters of the core.

The memory may include forms of a volatile memory, a random access memory (RAM) and/or a nonvolatile memory in a computer readable medium, such as a read-only memory (ROM) or a flash RAM, and the memory includes at least one memory chip.

An embodiment of the embodiments provides a storage medium, having a program stored thereon. When the program is executed by a processor, the above-mentioned method for determining the dosage of detergent is implemented.

An embodiment of the embodiments provides a processor, configured to operate a program, and when the program is operated, the above-mentioned method for determining the dosage of detergent is executed.

Figure 4:
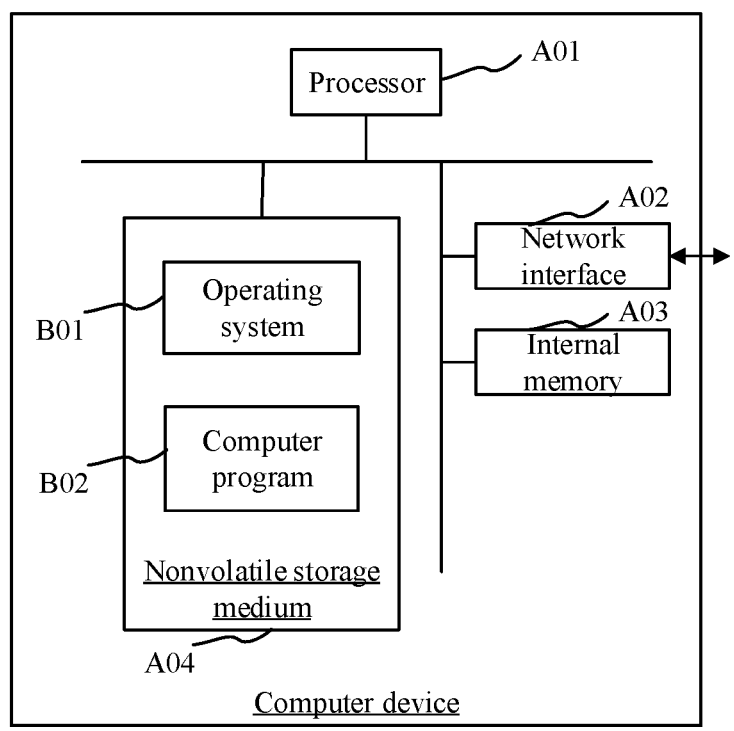
FIG. 4 schematically shows an internal structural diagram of a computer device according to an embodiment of the embodiments.

In one embodiment, provided is a computer device. The computer device may be a server, and an internal structural diagram thereof can be as shown in FIG. 4. The computer device includes a processor A01, a network interface A02, a memory (which is not shown in the drawing), and a database (which is not shown in the drawing) which are connected through a system bus, and the processor A01 of the computer device is configured to provide computing and control abilities; the memory of the computer device includes an internal memory A03 and a nonvolatile storage medium A04; the nonvolatile storage medium A04 stores an operating system B01, a computer program B02, and a database (which is not shown in the drawing); the internal memory A03 provides an environment for the operation of the operating system B01 and the computer program B02 in the nonvolatile storage medium A04; the database of the computer device is configured to store position data of tableware; the network interface A02 of the computer device is configured to be connected with and communicate with an external terminal through a network; and when the computer program B02 is executed by the processor A01, a method for determining a dosage of detergent is implemented.

The structural diagram shown in FIG. 4 is merely a block diagram of a partial structure related to the solution of the present application and does not constitute limitation to the computer device to which the solution of the present application is applied, a specific computer device may include more or fewer components than the structure shown in the drawing, or combine some components, or have different component layouts.

An embodiment of the embodiments provides a device. The device includes a processor, a memory, and a program which is stored on the memory and can be operated on the processor. When executing the program, the processor implements the following steps: obtaining an internal image of a dishwasher, acquired by an image acquisition device; determining whether a target object exists in the dishwasher according to the internal image; acquiring a degree of fouling of the target object in accordance with a determination that the target object exists; and determining a dosage of detergent of the dishwasher according to the degree of fouling.

In one embodiment, acquiring the degree of fouling of the target object on a condition that the target object exists includes: generating a position grid of the target object; and acquiring the degree of fouling of the target object according to the position grid on a condition that the target object exists.

In one embodiment, acquiring the degree of fouling of the target object according to the position grid includes: determining a first position of the target object in the position grid; determining a neighboring object adjacent to the target object in the position grid according to the first position; acquiring a first degree of fouling of the target object and a second degree of fouling of the neighboring object; and determining the sum of a preset proportion of the second degree of fouling and the first degree of fouling as the degree of fouling of the target object.

In one embodiment, acquiring the first degree of fouling of the target object and the second degree of fouling of the neighboring object includes: determining a first area of the target object and a second area of the neighboring object according to the internal image; acquiring the first degree of fouling according to the first area; and acquiring the second degree of fouling according to the second area.

In one embodiment, the neighboring object includes at least one of objects adjacent to the target object in the upper, lower, left, and right directions in the position grid.

In one embodiment, determining the dosage of detergent of the dishwasher according to the degree of fouling includes: determining a product of a preset constant coefficient and a square of the degree of fouling as the dosage of detergent of the dishwasher.

In one embodiment, determining whether the target object exists in the dishwasher according to the internal image includes: determining the degree of fouling as a preset value in accordance with a determination that the target object does not exist.

In one embodiment, resetting the dosage of detergent in response to a determination that a door of the dishwasher has a state in which the door is opened and then closed.

The present application further provides a computer program product. When the computer program product is executed on a data processing device, it is applicable to execute a program initialized with the following method steps: obtaining an internal image of a dishwasher, acquired by an image acquisition device; determining whether a target object exists in the dishwasher according to the internal image; acquiring a degree of fouling of the target object; and determining a dosage of detergent of the dishwasher according to the degree of fouling in accordance with a determination that the target object exists.

In one embodiment, acquiring the degree of fouling of the target object in accordance with a determination that the target object exists includes: generating a position grid of the target object in accordance with a determination that the target object exists; and acquiring the degree of fouling of the target object according to the position grid.

In one embodiment, acquiring the degree of fouling of the target object according to the position grid includes: determining a first position of the target object in the position grid; determining a neighboring object adjacent to the target object in the position grid according to the first position; acquiring a first degree of fouling of the target object and a second degree of fouling of the neighboring object; and determining the sum of a preset proportion of the second degree of fouling and the first degree of fouling as the degree of fouling of the target object.

In one embodiment, acquiring the first degree of fouling of the target object and the second degree of fouling of the neighboring object includes: determining a first area of the target object and a second area of the neighboring object according to the internal image; acquiring the first degree of fouling according to the first area; and acquiring the second degree of fouling according to the second area.

In one embodiment, the neighboring object includes at least one of objects adjacent to the target object in the upper, lower, left, and right directions in the position grid.

In one embodiment, determining the dosage of detergent of the dishwasher according to the degree of fouling includes: determining a product of a preset constant coefficient and a square of the degree of fouling as the dosage of detergent of the dishwasher.

In one embodiment, determining whether the target object exists in the dishwasher according to the internal image includes: determining the degree of fouling as a preset value in accordance with a determination that the target object does not exist.

In one embodiment, resetting the dosage of detergent in response to a determination that a door of the dishwasher has a state in which the door is opened and then closed.

The embodiments of the present application may be provided as a method, a system, or a computer program product. Therefore, the present application may adopt a form of a full hardware embodiment, a full software embodiment, or a software and hardware combined embodiment. Furthermore, the present application may adopt a form of a computer program product implemented on one or more computer available storage mediums (including, but not limited to, a disk memory, a compact disc read-only memory (CD-ROM), an optical memory, etc.) including a computer available program code therein.

The present application is described with reference to the flow chart and/or the block diagram of the method, the device (system), and the computer program product according to the embodiments of the present application. It should be understood that each flow and/or block in the flow chart and/or the block diagram and a combination of the flows and/or blocks in the flow chart and/or the block diagram may be implemented by computer program instructions. These computer program instructions may be provided to a processor of a general-purpose computer, a special purpose computer, an embedded processor or other programmable data processing devices to generate a machine, and the instructions executed by the processor of the computer or other programmable data processing devices generate an apparatus for achieving the functions specified in one or more flows of the flow chart and/or one or more blocks in the block diagram.

These computer program instructions may also be stored in a computer readable memory capable of guiding the computer or other programmable data processing devices to work in a specific mode, and the instructions stored in the computer readable memory generate a manufacture including an instruction apparatus. The instruction apparatus achieves the functions specified in one or more flows of the flow chart and/or one or more blocks in the block diagram.

These computer program instructions may also be loaded to the computer or other programmable data processing devices, and a series of operation steps are executed on the computer or other programmable data processing devices to generate processing implemented by the computer, and accordingly, the instructions executed on the computer or other programmable data processing devices provide steps for achieving the functions specified in one or more flows of the flow chart and/or one or more blocks in the block diagram.

In a typical configuration, a computing device includes one or more central processing units (CPUs), an input/output interface, a network interface, and a memory.

The memory may include forms of a volatile memory, a RAM and/or a nonvolatile memory in a computer readable medium, such as a ROM or a flash RAM. The memory is an example of the computer readable medium.

The computer readable medium includes nonvolatile, volatile, mobile, and non-mobile media and can implement information storage by any method or technology. Information may be a computer readable instruction, a data structure, a module of a program or other data. Examples of a storage medium of a computer include, but are not limited to, a phase-change random access memory (PRAM), a static random access memory (SRAM), a dynamic random access memory (DRAM), other types of RAMs, a ROM, an electrically erasable programmable read-only memory (EEPROM), a flash memory or other memory technologies, a CD-ROM, a digital versatile disc (DVD) or other optical memories, a cassette type magnetic tape, a magnetic tape disk memory or other magnetic storage devices, or any other non-transmission mediums, which can be used for storing information capable of being accessed by the computing device. According to the definition herein, the computer readable medium does not include transitory media, such as modulated data signals and carriers.

It should also be noted that terms such as "comprise", "include" or any other variations thereof are intended to cover non-exclusive inclusion, and a process, method, commodity or device including a series of elements not only includes these elements, but also includes other elements which are not explicitly listed, or also includes inherent elements of such process, method, commodity or device. In case of no more limitations, an element defined by the statement "comprise one" is not exclusive of a case that there are other same elements in the process, method, commodity or device including the element.

The above are only the embodiments of the present application, but not intended to limit the present application. Various changes and variations could be made to the present application. Any modifications, equivalent replacements, improvements and the like within the spirit and principle of the present application shall fall within the scope of claims of the present application.

What is claimed is:

1. A method for determining a dosage of detergent, applied to a dishwasher, wherein the dishwasher comprises an image acquisition device, a door and a spraying arm, and the method comprises:
   obtaining an internal image of the dishwasher acquired by the image acquisition device;
   determining whether a target object exists in the dishwasher according to the internal image;
   determining a position grid of the target object in determination that the target object exists;
   acquiring a fouling value of the target object according to the position grid;

calculating to obtain a product of a preset constant coefficient and a square of the fouling value as the dosage of detergent of the dishwasher;

actuating the spray arm and performing washing the target object;

detecting and monitoring a door status during washing; and in determination that the door is opened and then closed, recalculating the dosage of detergent, and performing washing the target object according to the recalculated dosage of detergent;

wherein the recalculating the dosage of detergent comprises:

obtaining the internal image of the dishwasher acquired by the image acquisition device;

determining whether the target object exists in the dishwasher according to the internal image;

determining the position grid of the target object in determination that the target object exists;

acquiring the fouling value of the target object according to the position grid; and calculating to obtain the product of the preset constant coefficient and the square of the fouling value as the recalculated dosage of detergent.

2. The method of claim 1, wherein acquiring the fouling value of the target object according to the position grid comprises:

determining a first position of the target object in the position grid;

determining a neighboring object adjacent to the target object in the position grid according to the first position;

acquiring a first fouling value of the target object and a second fouling value of the neighboring object; and determining a sum of a preset proportion of the second fouling value and the first fouling value as the fouling value of the target object.

3. The method of claim 2, wherein acquiring the first fouling value of the target object and the second fouling value of the neighboring object comprises:

determining a first area of the target object and a second area of the neighboring object according to the internal image;

acquiring the first fouling value according to the first area; and acquiring the second fouling value according to the second area.

4. The method of claim 2, wherein the neighboring object comprises at least one of objects adjacent to the target object in an upper, lower, left, and right directions in the position grid.

5. The method of claim 1, wherein determining whether the target object exists in the dishwasher according to the internal image comprises:

determining the fouling value as a preset value in accordance with a determination that the target object does not exist.

6. A dishwasher, comprising an image acquisition device, a door, a spraying arm and a processor, wherein the processor is configured to implement a method for determining a dosage of detergent applied to the dishwasher, and the method comprises:

obtaining an internal image of the dishwasher, acquired by the image acquisition device;

determining whether a target object exists in the dishwasher according to the internal image;

determining a position grid of the target object in determination that the target object exists;

acquiring a fouling value of the target object according to the position grid;

calculating to obtain a product of a preset constant coefficient and a square of the fouling value as the dosage of detergent of the dishwasher;

actuating the spray arm and performing washing the target object;

detecting and monitoring a door status during washing; and in determination that the door is opened and then closed, recalculating the dosage of detergent, and performing washing the target object according to the recalculated dosage of detergent;

wherein the recalculating the dosage of detergent comprises:

obtaining the internal image of the dishwasher acquired by the image acquisition device;

determining whether the target object exists in the dishwasher according to the internal image;

determining the position grid of the target object in determination that the target object exists;

acquiring the fouling value of the target object according to the position grid; and calculating to obtain the product of the preset constant coefficient and the square of the fouling value as the recalculated dosage of detergent.

7. The dishwasher of claim 6, wherein acquiring the fouling value of the target object according to the position grid comprises:

determining a first position of the target object in the position grid;

determining a neighboring object adjacent to the target object in the position grid according to the first position;

acquiring a first fouling value of the target object and a second fouling value of the neighboring object; and determining a sum of a preset proportion of the second fouling value and the first fouling value as the fouling value of the target object.

8. The dishwasher of claim 7, wherein acquiring the first fouling value of the target object and the second fouling value of the neighboring object comprises:

determining a first area of the target object and a second area of the neighboring object according to the internal image;

acquiring the first fouling value according to the first area; and acquiring the second fouling value according to the second area.

9. The dishwasher of claim 7, wherein the neighboring object comprises at least one of objects adjacent to the target object in an upper, lower, left, and right directions in the position grid.

10. The dishwasher of claim 6, wherein determining whether the target object exists in the dishwasher according to the internal image comprises:

determining the fouling value as a preset value in accordance with a determination that the target object does not exist.

11. A non-transitory machine-readable storage medium, having an instruction stored thereon, wherein when the instruction is executed by a processor, the processor is configured to implement a method for determining a dosage of detergent applied to a dishwasher, wherein the dishwasher comprises an image acquisition device, a door and a spraying arm, and the method comprises:

obtaining an internal image of the dishwasher, acquired by the image acquisition device;

determining whether a target object exists in the dishwasher according to the internal image;

determining a position grid of the target object in determination that the target object exists;

acquiring a fouling value of the target object according to the position grid;

calculating to obtain a product of a preset constant coefficient and a square of the fouling value as the dosage of detergent of the dishwasher;

actuating the spray arm and performing washing the target object;

detecting and monitoring a door status during washing; and in determination that the door is opened and then closed, recalculating the dosage of detergent, and performing washing the target object according to the recalculated dosage of detergent;

wherein the recalculating the dosage of detergent comprises:

obtaining the internal image of the dishwasher acquired by the image acquisition device;

determining whether the target object exists in the dishwasher according to the internal image;

determining the position grid of the target object in determination that the target object exists;

acquiring the fouling value of the target object according to the position grid; and calculating to obtain the product of the preset constant coefficient and the square of the fouling value as the recalculated dosage of detergent.

12. The non-transitory machine-readable storage medium of claim 11, wherein acquiring the fouling value of the target object according to the position grid comprises:

determining a first position of the target object in the position grid;

determining a neighboring object adjacent to the target object in the position grid according to the first position;

acquiring a first fouling value of the target object and a second fouling value of the neighboring object; and determining a sum of a preset proportion of the second fouling value and the first fouling value as the fouling value of the target object.

13. The non-transitory machine-readable storage medium of claim 12, wherein acquiring the first fouling value of the target object and the second fouling value of the neighboring object comprises:

determining a first area of the target object and a second area of the neighboring object according to the internal image;

acquiring the first fouling value according to the first area; and acquiring the second fouling value according to the second area.

14. The non-transitory machine-readable storage medium of claim 12, wherein the neighboring object comprises at least one of objects adjacent to the target object in an upper, lower, left, and right directions in the position grid.

\* \* \* \* \*